(12) United States Patent
     Kittelson

(10) Patent No.: US 9,439,412 B2
(45) Date of Patent: Sep. 13, 2016

(54) MOTION ACTIVATED NON-LETHAL ANIMAL TRAP

(71) Applicant: Richard Kittelson, Vancouver, WA (US)

(72) Inventor: Richard Kittelson, Vancouver, WA (US)

(*) Notice: Subject to any disclaimer, the term of this patent is extended or adjusted under 35 U.S.C. 154(b) by 20 days.

(21) Appl. No.: 13/738,297

(22) Filed: Jan. 10, 2013

(65) Prior Publication Data

US 2013/0174469 A1 Jul. 11, 2013

Related U.S. Application Data

(60) Provisional application No. 61/585,023, filed on Jan. 10, 2012.

(51) Int. Cl.
*A01M 23/20* (2006.01)
*A01M 23/18* (2006.01)

(52) U.S. Cl.
CPC .................................. *A01M 23/18* (2013.01)

(58) Field of Classification Search
CPC .... A01M 23/00; A01M 23/16; A01M 23/20; A01M 23/38
USPC ................. 43/60, 61, 62, 65, 67, 73, 74
IPC ................. A01M 23/16, 23/20, 23/38, 23/00
See application file for complete search history.

(56) References Cited

U.S. PATENT DOCUMENTS

| 383,972 | A | * | 6/1888 | Mittler ........................ 43/61 |
| 5,953,853 | A | | 9/1999 | Kim |
| 6,016,623 | A | | 1/2000 | Celestine |
| 6,865,843 | B1 | | 3/2005 | Jordan, Sr. |
| 7,076,913 | B1 | | 7/2006 | Dow |
| 8,024,888 | B2 | | 9/2011 | Wetzel |
| 2005/0097808 | A1 | * | 5/2005 | Vorhies et al. ............... 43/61 |
| 2006/0042153 | A1 | * | 3/2006 | Bowerman ..................... 43/61 |
| 2006/0123693 | A1 | * | 6/2006 | Muller et al. .................. 43/99 |
| 2009/0205244 | A1 | * | 8/2009 | Pomerantz ..................... 43/61 |
| 2011/0138676 | A1 | * | 6/2011 | Moustirats ..................... 43/61 |
| 2011/0179693 | A1 | * | 7/2011 | Chiu ........................... 43/61 |

* cited by examiner

*Primary Examiner* — Lisa Tsang

(57) ABSTRACT

Disclosed is a non-lethal animal trap that comprises a housing, a mechanically actuated trap door, a motion sensor, and a microprocessor controlled tripping mechanism. The trap includes a pathway having a first and second entrance and a first and second trap door. The pathway includes animal bait therein, whereabove a motion sensor detects objects and motion within the pathway such that the entrances to the pathway are closed by the trap doors. The motion sensor sends signals to the microprocessor, which in turn activates an electrical latch mechanism that releases the trap door mechanism from its set position to its closed position. Once closed, each trap door includes a brace that prevents the animal from forcibly opening the door. The animal is then trapped for later disposal or relocation. A plurality of indicator lights provides notification of the device operational state, including device standby, triggered, and trapped animal notification.

16 Claims, 5 Drawing Sheets

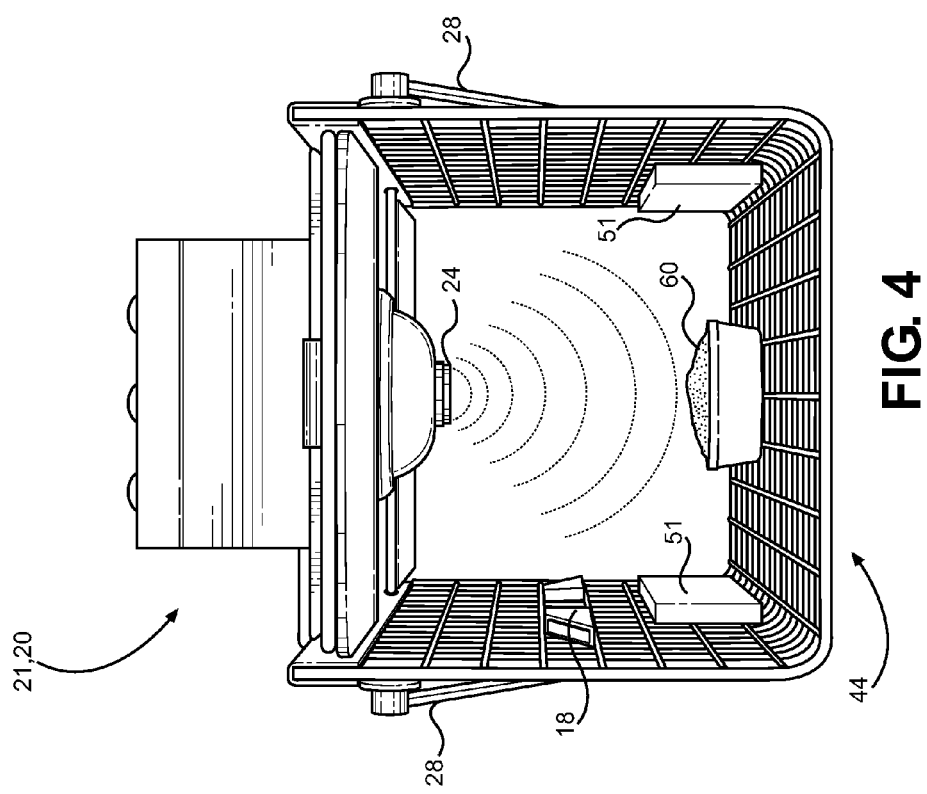

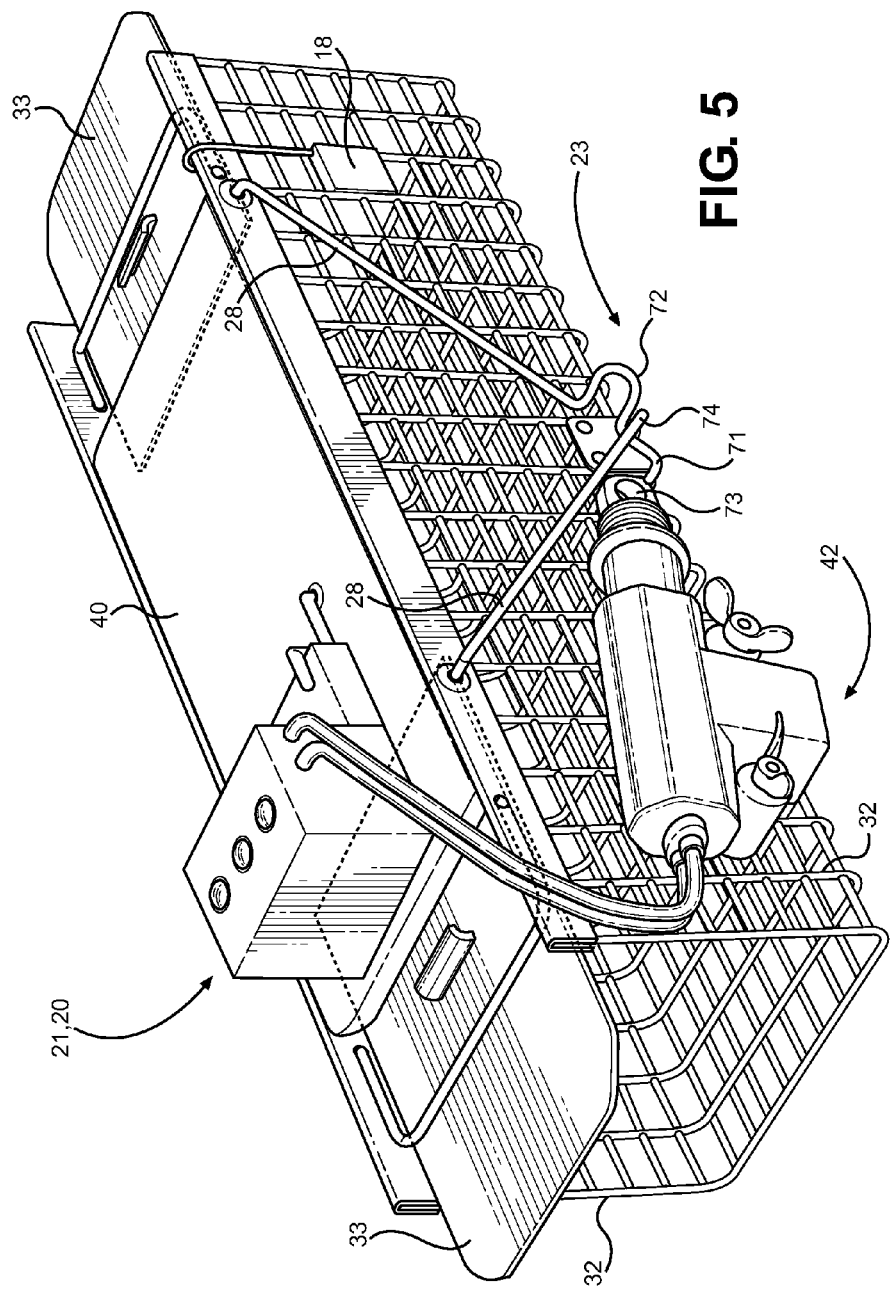

MOTION ACTIVATED NON-LETHAL ANIMAL TRAP

CROSS REFERENCE TO RELATED APPLICATION

This application claims the benefit of U.S. Provisional Application No. 61/585,023 filed on Jan. 10, 2012, entitled "Motion Sensor Activated Animal Trap." The above identified patent application is herein incorporated by reference in its entirety to provide continuity of disclosure.

BACKGROUND OF THE INVENTION

1. Field of the Invention

The present invention relates to animal traps and cages having a sensor to activate the trap when the animal is located therein. More specifically, the present invention relates to a motion sensing animal trap that activates in the presence of an animal within the cage and does not kill the animal.

Animal traps are well known devices in the art that include different types of cages, trap mechanisms, and means for either capturing or exterminating animals that engage the device. These devices can be categorized as being lethal or non-lethal devices, where the lethal traps utilize a means to kill the animal while the non-lethal traps capture and cage the animal. Animal traps can further be classified as either being purely mechanical or comprised of a combination of electromechanical elements that sense an animal's presence and electronically trigger the device. Many of the devices currently available, however, are plagued with a poor design that improperly activates as an animal engages bait within the device, activates prematurely and before the animal takes any bait, or further fails to detect the presence of the target animal within its limits. The most common and well known problem of animal traps resulting in unsuccessful trapping is the capacity of the animal to eat the bait therein without triggering the trap. Animals therefore circumvent the trap and nullify its usefulness after the bait has been taken, as no animal has been trapped and the lure for the animal has been removed.

Aside from a design that does not properly activate, many users do not wish to deploy a trap that kills or maims the animal in the process of trapping it. Most lethal traps utilize a mechanically actuated arm or cutting blade, while many other traps use tacky material to trap the animal in place to die slowly. Still other devices contemplate suffocating or electrocuting the animal once drawn into the trap using an high powered electric circuit or actuating mechanism that encloses the animal within a chamber to slowly die. These types of traps can be viewed as inhumane to some users. Still others may contemplate a cage or trap that is not designed for pest removal, but rather animal capture for research or relocation purposes. This alternate application and a desire not to hurt the target animal make most conventional traps unsuitable.

The present invention contemplates a non-lethal animal trap that includes a housing having a pathway, a centrally located bait, and an electrically actuated housing closure means that traps the animal within the cage without harming it. The trap utilizes a motion sensor that detects motion within the interior of the cage, eliminating the issue of an animal removing the bait from the trap trigger without the trap being sprung. Once the animal is detected within the cage interior, regardless of its engaging the bait, the trap is triggered and the animal is trapped. The bait, therefore, is only used for luring the animal into the trap, while the motion sensor triggers the trap. The animal passes through an open door to enter the trap, after which the open door is closed and locked in place behind the animal. A microprocessor controls operation of the trap and a power supply powers the sensor and the latch actuator, which triggers the door to close. Once enclosed within the cage, the animal is trapped and the user can then carry the cage and animal to another location.

2. Description of the Prior Art

Devices have been disclosed in the prior art that relate to animal trap devices. These include devices that have been patented and published in patent application publications, and generally relate to lethal animal traps or those without accompanying motion sensing means for ensuring activation upon interaction with a target animal. The following is a list of devices deemed most relevant to the present disclosure, which are herein described for the purposes of highlighting and differentiating the unique aspects of the present invention, and further highlighting the drawbacks existing in the prior art.

Specifically, U.S. Pat. No. 5,953,853 to Kim discloses a rodent trap that comprises a housing having an electrocution platform and a movable partition that ushers the rodent onto the platform once it has entered and been contained by the trap. An activation sensor detects the presence of the rodent having entered the trap, after which the partition is activated and drive means moves the partition through the trap interior. A removable tray of bait is placed at one end of the trap, whereafter the partition passes by the opening in the trap to seal the rodent's escape once therein. The Kim device discloses a mechanical trap having an electrical actuation and a means of terminating the rodent once therein. The present invention pertains to an animal trap that trips a trap door, enclosing the animal within the cage based on signals received from an electrical motion detector sensor.

Another such device is U.S. Pat. No. 6,865,843 to Jordan, Sr., which discloses a portable electrical mouse trap having an outer housing in the shape of a cat. Within the housing is an interior cavity that includes two motion sensors, a collection chamber, a primary gate at the opening of the housing and a secondary gate closing the collection chamber within the housing. Upon the sensors recognizing movement therein, the main gate closes and the collection chamber gate opens, whereafter a vacuum source activates to suck the mouse fully into the collection chamber, suffocating the rodent. The Jordan, Sr. device describes a vacuum powered device that kills the rodent and collects it into a chamber. The present invention pertains to a humane trap that does not kill the rodent, but keeps it contained within the cage housing upon motion detection therein and activation of the cage gates.

U.S. Pat. No. 6,016,623 to Celestine discloses a rodent trap that comprises a housing, a rodent entry ramp, and a trap door that drops the floor of the housing and causes the rodent to fall into a collection box. The trap door is activated by a high speed DC motor and activated by an infrared sensor positioned within the housing, whereby the trap door rotates between a ready position and an open position using a cam switch to return the door to its ready position. A spring biased cover and the closed trap door seal the collection box to secure the rodent therein. Once a rodent is trapped, an indicator is activated by the rodent weight on a sensor along the bottom surface of the box to alert a user that a rodent has been trapped. The Celestine device utilizes a trap door, which may or may not function properly with larger rodents. The hole in the floor, the motion of the trap door, and the capacity of the collection box may make the overall housing very large for moderate to large rodents. By contrast. the present invention utilizes the same housing to draw the rodent within the cage, whereafter the cage doors are activated by a central motion sensor that detects movement within the cage. The cage itself can be scaled as necessary, and does not rely on any transfer from one area to another within the cage as is necessary in the Celestine device.

Finally, U.S. Pat. No. 8,024,888 to Wetzel discloses an electronic animal trap that comprises a computer controlled, rearming and multiple killing plate construction that utilizes a beam sensor to trigger the device. The killing plates are connected to a high voltage output circuit that kills the rodent upon contact therewith, whereby the sensor triggers the circuit. The plate is rearmed after the output circuit cycles, or is placed in standby mode if the sensor detects an object remaining in its path. This allows a user to remove a dead animal on the plate without fear of contacting the plates. The plates and sensor are housed within a trap body, while visual indicators provide a user with notification of the trap mode. The Wetzel device, while utilizing a CPU controlled trap that is triggered by a motion sensor, contemplates killing the rodent within the trap. The present invention pertains to an electronically controlled and motion sensor triggered trap that contains the rodent for later disposal or relocation. The present invention utilizes the motion sensor to trigger a mechanism that drops a locking door to the trap entrance, whereafter the rodent within the trap can be relocated to another location.

The present invention provides a non-lethal, motion-sensing animal trap that activates when an animal is detected within the interior of the trap housing. The trap mechanism is tripped by an electromechanical latch or actuator that causes a trap door to close over at least one entrance to the housing, which locks into place after being tripped to trap the animal within the housing. It is desired to disclose a trap that utilizes a motion sensing means that does not harm the animal and keeps it trapped until a user is able to relocate the animal using the cage. It is submitted that the present invention is substantially divergent in design elements from the prior art, and consequently it is clear that there is a need in the art for an improvement to existing non-lethal, motion sensing animal trap devices. In this regard the instant invention substantially fulfills these needs.

SUMMARY OF THE INVENTION

In view of the foregoing disadvantages inherent in the known types of animal traps now present in the prior art, the present invention provides a new, non-lethal trap that utilizes a motion sensor therein for providing convenience for the user when trapping an animal or pest without harming the animal and ensuring proper and timely operation of the device when an animal interrogates the housing interior.

It is therefore an object of the present invention to provide a new and improved non-lethal animal trap device that has all of the advantages of the prior art and none of the disadvantages.

It is another object of the present invention to provide a non-lethal animal trap device that has a low frequency of non-triggering when an animal is within its limits, as the trap does not rely on the animal interacting with a bait pan, but rather utilizes a bait pan to lure the animal within a zone being monitored by a motion sensor to trigger the trap.

Another object of the present invention is to provide a non-lethal animal trap device that utilizes an elongated housing having at least one entryway that leads to a pathway having bait, whereby a motion sensor monitors movement within housing and triggers the doors to close around the animal and lock into place in a closed position.

Yet another object of the present invention is to provide a non-lethal animal trap device that contemplates a motion sensor having different technologies for the purposes of detecting motion, an object presence, or impingement into a monitored area.

Another object of the present invention is to provide a non-lethal animal trap device that includes an electromechanical trigger, whereby an electromechanical solenoid, actuator, or electric motor releases a set mechanical linkage controlling the operation of the trap doors.

A final object of the present invention is to provide a non-lethal animal trap device that utilizes an electrical power source and provides a housing that can be scaled to trap smaller or larger animals, as desired by the end user.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 4 shows an end view of the present invention, whereby the bait and the location of the motion sensor is visualized.

FIG. 5 shows a perspective view of an alternate embodiment of the present invention, wherein an actuator is utilized to release a trigger mechanism.

DETAILED DESCRIPTION OF THE INVENTION

Figure 1:
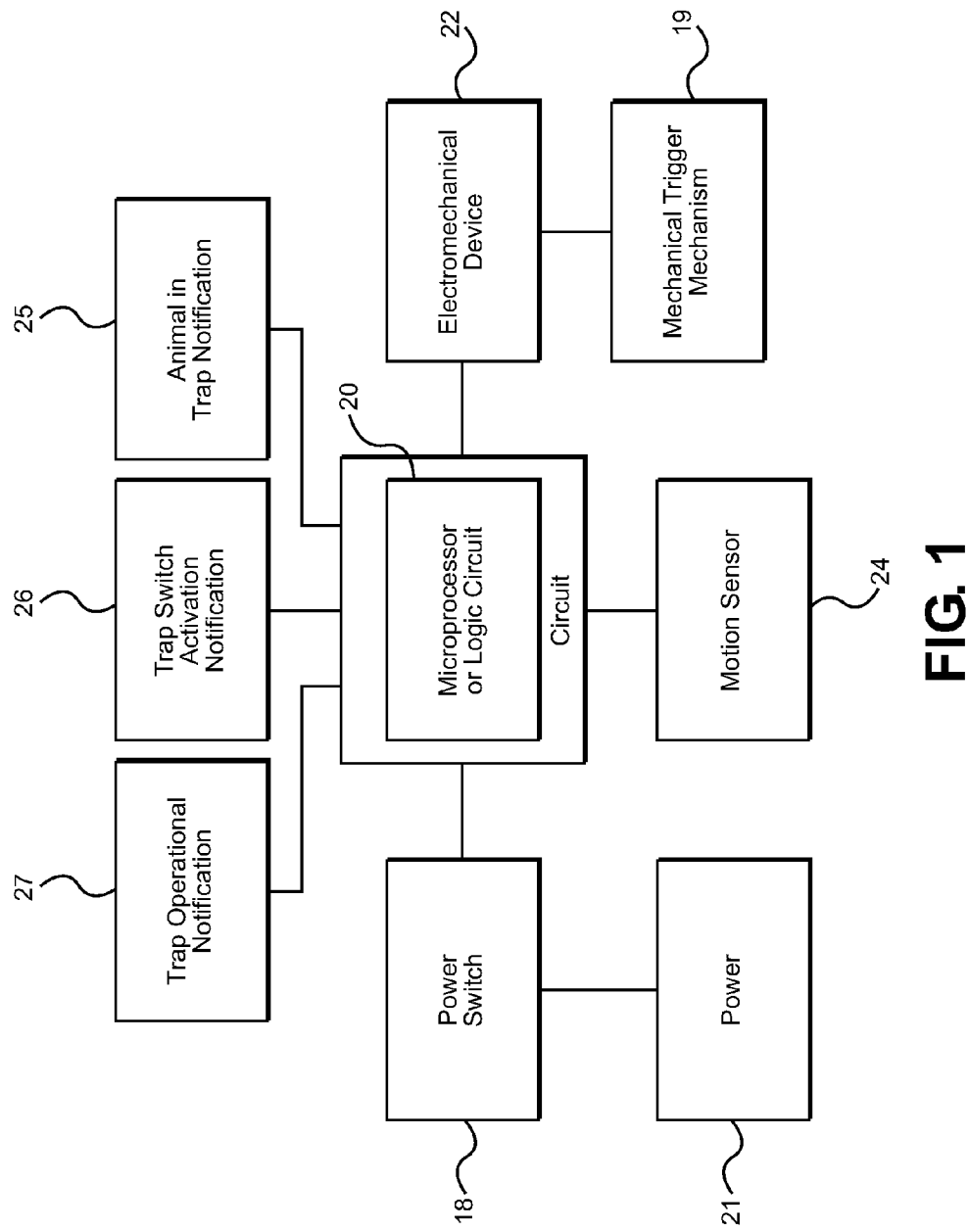
FIG. 1 shows a schematic of the present invention.

Reference is made herein to the attached drawings. Like reference numerals are used throughout the drawings to depict like or similar elements of the animal trap device. For the purposes of presenting a brief and clear description of the present invention, the preferred embodiment will be discussed as used for trapping an animal within an elongated housing without harming the animal in the process, whereby a motion sensor detects the motion of the animal once in the housing and a microprocessor activates a electromechanical trigger. The figures are intended for representative purposes only and should not be considered to be limiting in any respect.

Referring now to FIG. 1, there is shown a schematic diagram of the functional elements of the present invention. The device comprises an animal trap having a combination of mechanical and electrical elements that control its operation and activation. An electrical circuit having a processing means that comprises microprocessor or logic circuit receives input and directs operation of the trap elements to first detect an animal presence within the trap and thereafter activate the trap trigger mechanism 19 to enclose the animal within the housing. A motion sensor 24 is positioned within the trap housing and is electrically connected to the processing means 20, whereby the motion sensor 24 monitors an area within the housing around an animal bait. An animal attracted by the bait enters the housing interior to investigate and consume the bait. When a change in state of the motion detector occurs, the processing means 20 determines if the event is indeed a triggerable event, whereafter the a signal is sent to a electromechanical device 22 that actuates or affects mechanical movement, triggering the trap door switch mechanism 19 to release at least one housing trap door around the animal within the housing. Once the trap door is in a closed position, a switch 18 is closed that ceases power to the system. The ceasing of power may be governed by the logic of the system, whereby it may be desirable to maintain power for the notification means after the trap has closed, or alternatively in the absence of any notification the system as a whole may power down. The goal is to preserve battery life of the system after the trap has been triggered. The extent of this power shutdown may be limited to the motion sensor, the electromechanical trigger, or the system as a whole, depending on the system and user requirements.

Several technologies are contemplated for the motion sensor monitoring the interior of the trap housing. The goal is to monitor an area enclosed by the trap housing and within its interior limits, while avoiding false triggers from outside influences or events that do not include an animal positioned within the housing. False triggers are highly undesirable and result in a non-compliant system that fails to operate as an effective trap. Therefore the sensor beam or detection area should be sufficiently robust to not send false positives to the microprocessor 20, and further the logical control of the microprocessor 20 should be sufficiently robust to determine an actual impingement of an animal within the trap and not otherwise trigger the trap if smaller objects enter the housing (such as insects, dust, debris, etc.). Technologies such as infrared, infrared beam, ultrasonic, microwave, and tomographic detectors are all contemplated. Ultrasonic sensors may be audible to certain animals, therefore infrared technology is preferred; however it is not desired to limit the present invention to a specific technology of sensor, but rather to disclose a functional embodiment that fulfills the needs of the overall device. The sensitivity of the sensor or the logic controlling the sensor can be adjustable depending on the animal desired to be captured (e.g. if the user is only interested in capture larger animals while disregarding smaller animals)

The electromechanical device 22 is preferably an electromechanical solenoid, a powered latch, or actuator that creates a mechanical movement based on electrical input to trip the trap mechanism 19 supporting the trap doors in an open, standby configuration. The electromechanical device 22 can also be an electric motor driving a latch or other electromechanical technology that creates mechanical movement to trip the trap mechanism 19. Once the trap has been triggered, the doors are locked into a closed position until a human user is able to open the doors from the outside.

In operation, several notification means can be deployed to notify the user of the trap device operation and if a successful trap triggering event has occurred. A trap operational notification 27 communicates to the user that the device remains powered and in a standby condition—ready to activate if the motion detector experiences a change in state that equates to animal movement in the trap interior. The operational notification can provide notice that the device remains powered 21, or begin its notification when the power source has been sufficiently drained such that a new power source is necessary and the user's attention is necessary. A second notification 26 communicates to the user that the trap has been triggered and the doors of the trap are closed. This tells the user that the trap is no longer a functional trap in a standby condition and the device has activated since being deployed. Finally, a third notification 25 is contemplated to inform the user after the trap has been activated if there is also movement within the trap interior, indicating that the trap has successfully trapped an animal and that the user is required for further action.

The notifications 25-27 can take on several different forms depending on the needs of the user and the requirements of the trap. In their most basic form, these notifications include indicator lights along the exterior of the trap housing that the user can quickly visualize without interrogating the trap. This type of notification is convenient and appropriate for use around a dwelling or when several devices are deployed in a given area and quick scanning of the traps may be desired. However, in farther, more remote or spread out locations, the user may desire a notification that includes a transmitted signal. Contemplated technologies include wireless transmission using a signal antenna that transmits notifications over a wireless network, a cellular network, a radio broadcast, or satellite communication. Traps for larger, more exotic animals may require more rigorous notification means that can be transmitted over great distances, particularly if deployed in the field where regular user interaction is not possible or convenient. For domestic use or smaller scale commercial use, however, shorter range or even visual notification may be sufficient, reducing complexity and per unit cost of the assembly.

Figure 2:
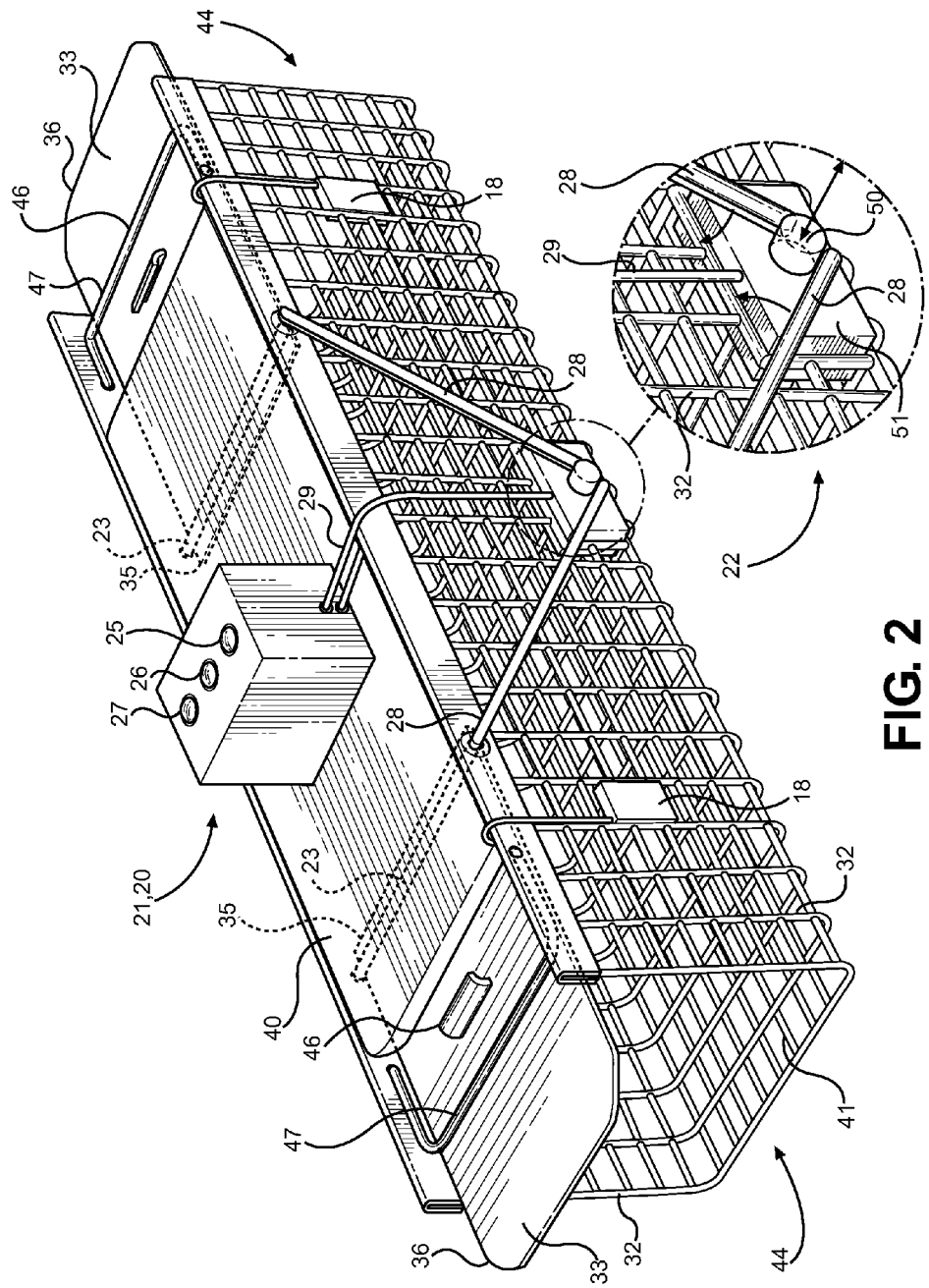
FIG. 2 shows a perspective view of the present invention in an armed and standby position.
Figure 3:
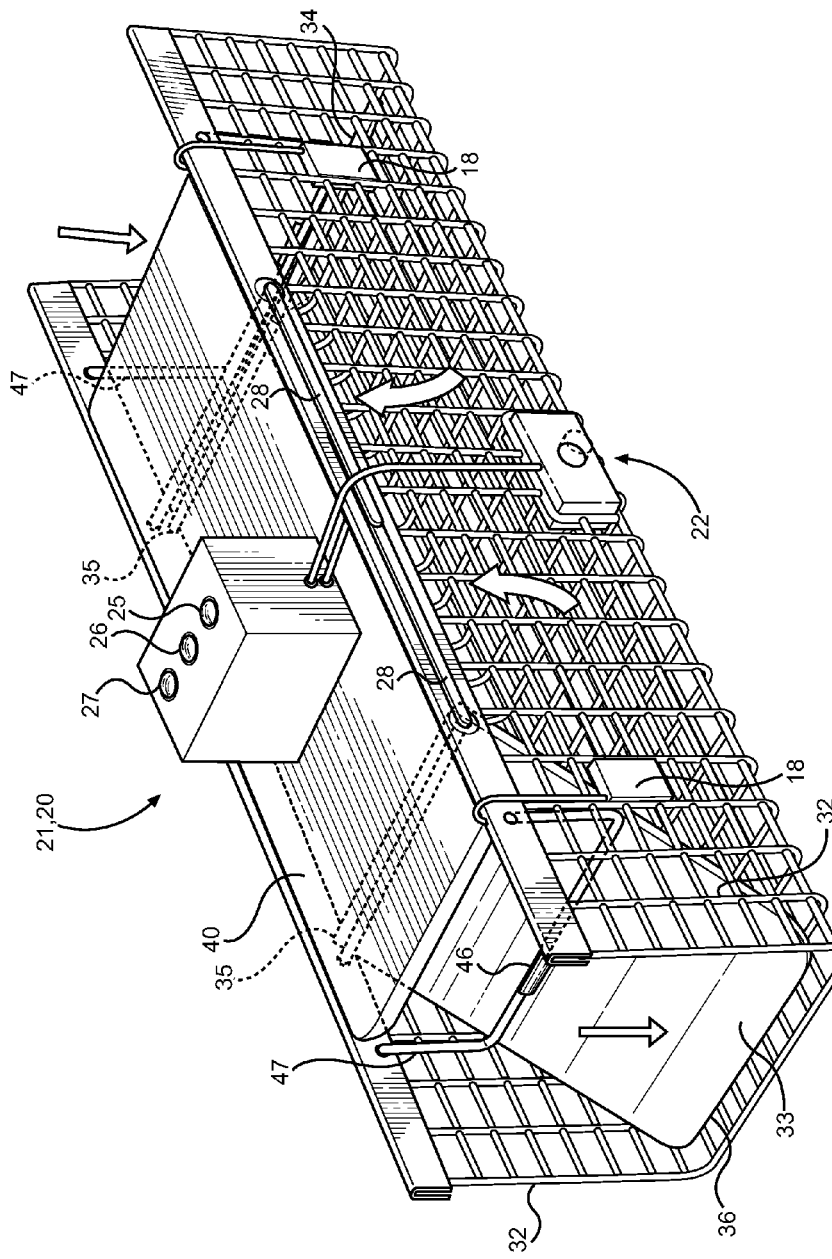
FIG. 3 shows a perspective view of the present invention in a closed position after the trap has been triggered.

Referring now to FIGS. 2 and 3, there are shown perspective views of the animal trap of the present invention. The structure of the trap preferably comprises an elongated housing having a first and second opposing opening 44 that lead into the housing interior. The housing is an elongated and tubular pathway that is adapted to allow an animal to full enter the structure before the motion sensor triggers the trap mechanism. Bait is placed centrally within the housing such that the animal fully enters the housing to investigate the bait, allowing the openings 44 to be fully closed when activated and not be supported by the animal in a partially open state. The housing structure preferably comprises a base 41, upstanding sidewalls 32, and a roof 40 forming a rectangular pathway. The structure may comprise a solid material or further an open cage material, as desired by the user and the intended use of the device.

Suspended over each opening 44 when in an operational state is a pivotably attached door 33 that is secured along its interior end 35 by a pivot joint and is free along its outer end 36. When the trap is triggered, the door swings from a horizontal, standby position or a downwardly angled position wherein the door outer end 36 contacts the base 41 of the structure. The door is sufficiently sized such that when angled downward in a triggered state, its area consumes the entire opening 44 to prevent an animal from bypassing the door after being trapped.

Supporting the door 33 is an elongated bar member 23 that is statically connected to the inner end of the door 35. The bar 23 extends across the width of the structure and is supported along the upper portion of each of the housing sidewalls 32, wherein when the door 33 pivots, the bar member 23 rotates in connection with the door interior end 35. The bar member 23 extends through at least one housing sidewall 32 and forms a perpendicular exterior length 28 extending to the electromechanical trigger device 22. The end of the bar member exterior length 28 is supported by the trigger device when in a standby state, and thereafter released when the trigger is actuated. This releases the bar member outer length 28 that in turn releases the support of the door 33 in its horizontal position, causing the door 33 to pivot downward under its own weight and the exterior portion 28 of the bar member to rotate upward. Both bar members portions 28 are simultaneously supported such that when released, both doors closed the openings 44 and enclose an animal therein.

Along the upper surface of the door 33 is a catch mechanism that prevents the door 33 from being pushed open from the interior of the trap housing. Preferably this mechanism comprises a hook or lip 46 and a freely pivoting brace 47 that engage one another only after the door 33 pivoted downward and is in a closed position. Pressure along the interior of the door 33 that attempts to pivot the door 33 upward is counteracted by the brace 47 bearing against the lip member 46, preventing upward movement and therefore locking the door 33 in a closed position. Releasing the door requires the user to first lift the brace 44 away from the door 33, and then raising the door 33 thereafter, which is only possible when engaged from the outside of the housing by a user. This prevents the animal from trying to forcibly open the doors 33 after they have been activated and closed, trapping the animal within the housing until the user frees the doors 33 from the outside.

Supported along the roof 40 of the housing is the power supply 21 and associated electrical controls that process the interiorly-mounted motion detector and activate the trap mechanism 22. The power supply 21 is preferably a battery pack that is electrically connected to a circuit having a microprocessor 20 or equivalent control logic for interpreting signals from the motion sensor and triggering the trap. This assembly may be provided within a housing to insulate the battery and electronics therein. Along the roof 40 or along the electronics housing may be positioned the notification lights 25-27 that provide visual indication of the device operation, including operational ready or stand-by mode 27, trap trigger notification 26, and animal within housing notification 25. Alternatively, these notifications may be wireless communication means within the interior of the electronics housing, which send signals to a user as to the status of the device while deployed.

Along at least one side of the housing is the electronically controlled trigger mechanism 22 that activates the doors 33 of the trap. This assembly controls the mechanical operation of the doors 33, whereby when the doors are in a ready standby-mode, the doors 33 are elevated and supported by the trigger mechanism 22. The weight of the doors 33 biases the system, whereby the natural, resting position of the doors 33 is in a closed state, making the external portions 28 of the bar members 23 biased toward a horizontal configuration. The trigger mechanism 22 supports the external portions 28 in a downwardly angled position prior to release thereof upon detection of an animal within the housing. The doors potential energy is utilized to close the entrances 44 of the housing once released, whereby the weight of the doors 33 causes them to swing downward to enclose the animal therein. Once in a closed position, an electrical contact 18 is made that signifies the processing means to power down or otherwise ceases power draw from the battery.

Supporting the exterior portion 28 of the door support members 23 is preferably an electrically actuated latch member 50 that is capable of being withdrawn and extended from a housing 51 along the sidewall of the housing. The latch may be driven by a small electric motor or similar device that effectuates inward and outward motion. The latch supports the terminal ends of the external portions 28, whereupon retraction of the latch 50 the portions 28 rotate upward and release the doors 33. The latch housing 51 supports an electric motor or actuator, whereby the housing 51 may be situated within a penetration along the sidewall 32 or externally mounted to prevent damage thereto from an animal within the cage. If extending inward, the penetration of the housing 51 is kept to a minimum to prevent any restrictions or narrow sections within the housing pathway.

Referring now to FIG. 4, there is shown an end view of the present invention in an open, standby state. Within the interior of the housing is a portion of animal bait 60, which is placed directly beneath a motion sensor 24 that is monitoring the space within the interior of the housing for changes in state. When an animal enters 44 into the monitored area of the motion detector 24, the change in state is registered by the microprocessor 20, whereafter a signal is sent to the trigger mechanism housing 51 to actuate the electromechanical trigger mechanism to release the external portions 28 of the door support members. The trigger mechanism may be provided on a single side of the housing or placed along two opposing sidewalls to create trigger redundancy, whereby two triggers are utilized to release the doors to prevent incidental release of the doors if one trigger is prematurely released prior to impingement of an animal within the cage interior.

Referring now to FIG. 5, there is shown an alternate embodiment of the present invention, which contemplates an externally mounted actuator 42 and a release mechanism 23 whereby the two outer portions of the door support members are overlapped and supporting one another. In this embodiment, when the presence of an animal is detected and a signal is sent to the actuator, the actuator advances its head 73 toward the release mechanism 23 to drop the doors 33 of the housing. A first outer portion includes a curved support 72, whereunder the terminal end 74 of the adjacent outer member is placed. To release the two portions 28 from one another, the actuator head 73 contacts a lower extension 71 of the supporting portion to release the two portions from one another. Prior to release, the two portions 28 bear against one another to maintain a static configuration, whereafter a dislodgment of the two portions allows the two to separate and the doors to fall into a closed position. This embodiment contemplates a release mechanism 23 that is disturbed by an actuator 42, rather than a release mechanism that is supported by a latch prior to be released, as is provided in the first disclosed embodiment. Both embodiments provide a robust means of activating the trap based on input from a motion sensor and processing control.

Many dwellings face issues with rats, mice, and other types of rodent pests. There are a variety of traps available for consumers to trap and kill such pests, however, many prove to be inefficient and often times fail to capture the rodent. The present invention pertains to a robust animal trap that does not kill or maim the animal, and further still can be deployed in a number of different scenarios. Homeowners can deploy the device to humanely gather pests for removal, while researchers and wildlife experts can trap larger or more elusive animals without harming them. The present invention provides a scalable trap that can be tailored to a particular application. The sensitivity of the system can be updated as well as the size can be designed for a specific type of target animal. Finally, the user is provided a means of notification that allows for ready communication of the trap status when deployed.

Overall, it is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A non-lethal, motion detecting animal trap, comprising:
a housing having at least one opening, a base, upstanding sidewalls, and a roof forming an interior;
the at least one opening having a trap door that is positionable in an open position and a closed position thereover;
the trap door including a door catch mechanism that is adapted to lock the trap door in said closed position and prevent said trap door from opening when pressed upon from said interior of said housing;
a power supply;
a motion sensor directed within said housing interior and that monitors a change in state within said housing interior;
a circuit for receiving signals from said motion sensor and sending a signal to an electromechanical trigger device;
said electromechanical trigger device creating a mechanical movement that releases said trap door into said closed position;
the trap door having an outer edge and an interior edge, whereby the trap door is sized to fit within the housing interior; and
a bar member having an inner portion extending horizontally across and statically connected to the interior edge of the trap door, the bar member rotating when the trap door pivots;
wherein the trap door is pivotably supported between the upstanding sidewalls, whereby the trap door is configured to pivot from the open position to the closed position such that the outer edge of said trap door is in contact with the base of the housing;
the bar member including an outer portion perpendicular to the inner portion and extending along an exterior surface of one of the upstanding sidewalls, a distal end of the perpendicular outer portion supported by the electromechanical trigger device in a biased configuration;
whereby when said electromechanical trigger device is triggered, the electromechanical trigger device releases the distal end of the bar member and the trap door rotates from said open position and to said closed position;
said open position of said trap door comprising a substantially horizontal position, and said closed position comprising a downward position; and
whereby when the distal end is released, the bar member rotates upward along the upstanding sidewalls.

2. The animal trap of claim 1, wherein:
said housing interior forms a pathway to lead an animal into said motion sensor monitored area; and
said door catch mechanism resists upward pivoting of said trap door once said trap door is in said downward position.

3. The animal trap of claim 1, wherein said electromechanical trigger device further comprises an electrically driven latch member.

4. The device of claim 1, wherein said electromechanical trigger device further comprises an externally mounted actuator and a bar member outer portion release mechanism.

5. The animal trap of claim 1, wherein said electromechanical trigger device further comprises an electromechanical solenoid.

6. The animal trap of claim 1, wherein said electromechanical trigger device further comprises an electric motor and an outer portion release mechanism.

7. The animal trap of claim 1, wherein:
the at least one opening of said housing comprises a first opening and a second opening each having one of the trap door; and
the electromechanical trigger device is configured to simultaneously release the trap door of the first opening and the trap door of the second opening.

8. The animal trap of claim 1, further comprising at least one electrical switch activated once said trap door is released to cease power to said motion sensor to preserve said power supply.

9. The animal trap of claim 1, further comprising a trap standby notification device comprising an illuminated indicator light.

10. The animal trap of claim 1, further comprising a trap activated notification device comprising an illuminated indicator light.

11. The animal trap of claim 1, further comprising an animal capture notification device comprising an illuminated indicator light.

12. The animal trap of claim 1, wherein the door catch mechanism is adapted to prevent the trap door from pivoting from the downward position and to the substantially horizontal position when the trap door is in the downward position and pressed upon from the interior of the housing.

13. The animal trap of claim 12, wherein the door catch mechanism further comprises a pivoting brace that is adapted to engage a hook along an outer surface of the trap door when the trap door is released into the downward position, whereby upward motion against an interior surface of the trap door is resisted by the pivoting brace against the hook.

14. The animal trap of claim 1, further comprising a trap standby notification device comprising a wireless communication device that is adapted to transmit a signal to a remote user when the electromechanical trigger device has not released said trap door.

15. The animal trap of claim 1, further comprising a trap activated notification device comprising a wireless communication device that is adapted to transmit a signal to a remote user when the electromechanical trigger device has released said trap door.

16. The animal trap of claim 1, further comprising an animal capture notification device comprising a wireless communication device that is adapted to transmit a signal to a remote user when the electromechanical trigger device has released said trap door and said motion detector registers movement within said interior of the housing.

* * * * *